United States Patent [19]
Giuriati et al.

[11] Patent Number: 5,460,578
[45] Date of Patent: Oct. 24, 1995

[54] TRANSMISSION WITH INTEGRATED BRAKE PARTICULARLY FOR VEHICLES

[75] Inventors: Adriano Giuriati, Padova; Giovanni Zorzi, San Giorgio Delle Pertiche, both of Italy

[73] Assignee: M.P.M. Meccanica Padana Monteverde S.p.A., Caselle Di Selvazzano, Italy

[21] Appl. No.: 131,244

[22] Filed: Oct. 4, 1993

[30] Foreign Application Priority Data

Oct. 9, 1992 [IT] Italy .................. PD92A0176

[51] Int. Cl.⁶ .............. F16H 1/28; F16D 55/39
[52] U.S. Cl. .................. 475/159; 192/4 A; 188/72.9
[58] Field of Search .................. 475/338, 159; 188/72.9, 71.5, 71.6; 192/4 A

[56] References Cited

U.S. PATENT DOCUMENTS

| | | | |
|---|---|---|---|
| 4,961,485 | 10/1990 | Huff et al. | 192/4 A |
| 5,147,255 | 9/1992 | Strehler et al. | 192/4 A |

FOREIGN PATENT DOCUMENTS

| | | |
|---|---|---|
| 3922216 | 1/1990 | Germany . |
| 4011304 | 8/1991 | Germany . |
| 2075622 | 11/1981 | United Kingdom . |
| 9011907 | 10/1990 | WIPO . |

*Primary Examiner*—Rodney H. Bonck
*Assistant Examiner*—Sherry Lynn Estremsky
*Attorney, Agent, or Firm*—Guido Modiano; Albert Josif

[57] ABSTRACT

Transmission with integrated brake particularly but not exclusively usable for vehicles. The transmission includes, in an oil bath inside a containment and support casing, an epicyclic reduction unit which is kinematically connectable to a drive unit by means of at least two gears, of which the driven one is axially fixed, is coaxial to a sun gear of the reduction unit and is associated therewith by means of a splined coupling. A disk brake is arranged between the epicyclic reduction unit and the driven gear and has at least one first disk rigidly coupled to an internally toothed ring gear which is rigidly coupled to the containment casing and at least one second disk which is rigidly coupled so as to rotate together with the driven gear. The disk brake is associated with axially movable packing pushers.

20 Claims, 3 Drawing Sheets

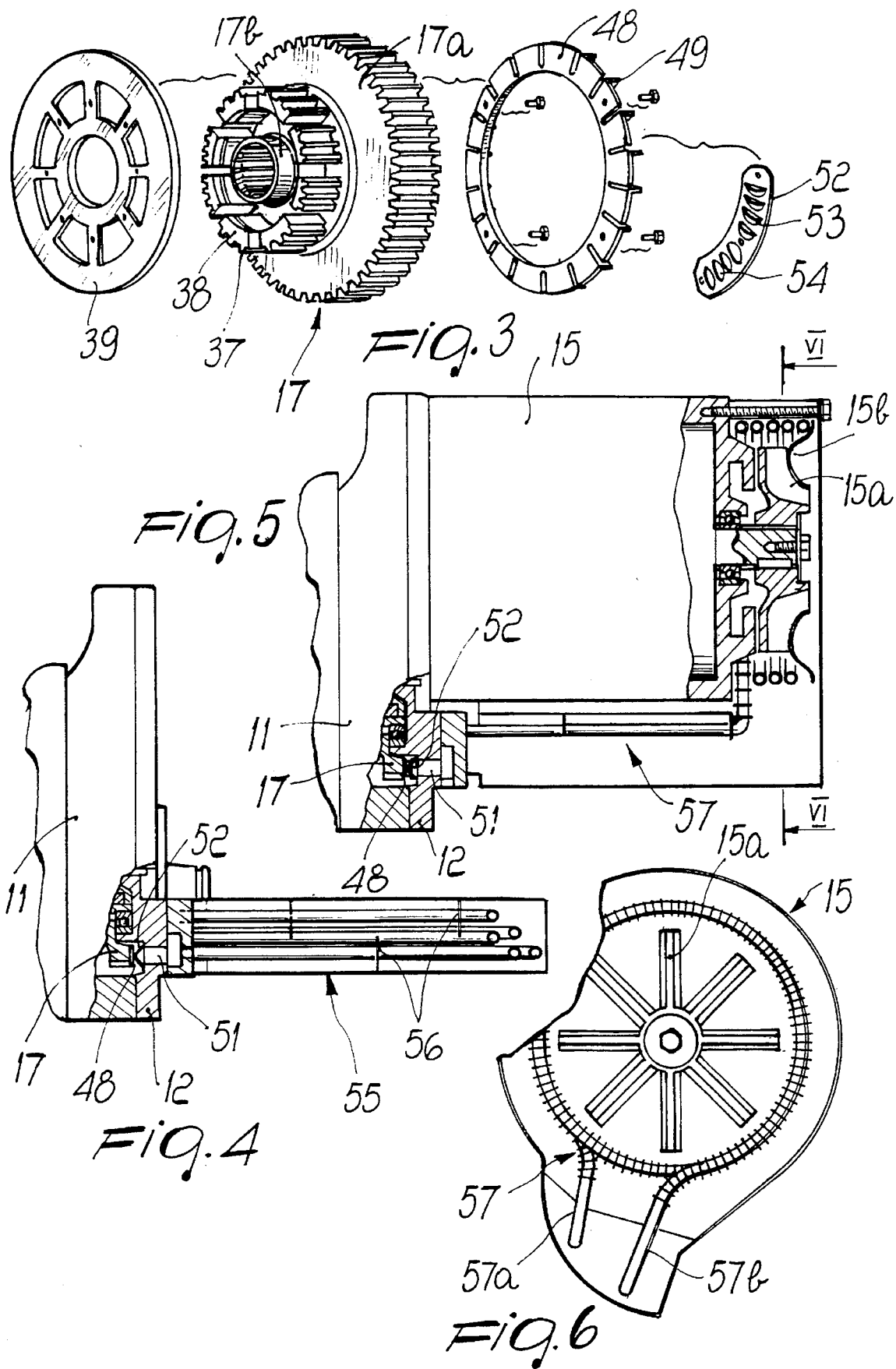

TRANSMISSION WITH INTEGRATED BRAKE PARTICULARLY FOR VEHICLES

BACKGROUND OF THE INVENTION

The present invention relates to a transmission with integrated brake particularly but not exclusively usable for vehicles.

Indoor transport vehicles, such as for example forklift trucks, normally use electric motor units, each of which, when coupled to a transmission, forms a drive unit.

The transmissions suitable for these drive units include the one disclosed by patent DE 4010742.

This transmission has, in an oil-bath casing, an epicyclic reduction unit which is connected, by means of a driven gear which is coaxial thereto and axially movable, to a pinion keyed on the driving shaft.

A disk brake is arranged between the epicyclic reduction unit and the driven gear and its disks are alternately coupled so as to rotate together with the former or with the latter.

Packing of the disk brake is achieved by means of a thrust pin which acts on the driven gear, moving it axially.

More in particular, one disk holder is fixed to the driven gear and one disk holder is integrated with an internally-toothed ring gear of the epicyclic reduction unit, whereas the pushers act in contrast with a spring resting against the sun gear of the reduction unit.

Although it is appreciated because of the numerous advantages it has with respect to the known art, this transmission is nevertheless not free from drawbacks, including the one due to the considerable thrust forces required to move the driven gear and pack the disks of the brake.

Another drawback is due to the fact that it is not possible to use helical teeth for the pinion and for the driven gear.

Another equally significant drawback is due to the fact that the oil contained in the casing is unable to dissipate the heat produced by braking.

Furthermore, the contrast spring, which rests on the planet gears of the reduction unit, has been found to be a hardly optimum solution for the good operation of the gears.

SUMMARY OF THE INVENTION

A principal aim of the present invention is to provide a transmission with integrated brake, particularly for vehicles, which solves the drawbacks described above in known types.

Another primary aim is to provide a transmission which is better than current ones from the point of view of its kinematic chain.

Another important aim is to provide a transmission which is more solid and thus subject to less wear.

Yet another aim is to provide a transmission which can also use helical gears for kinematic connection between the driving shaft and the epicyclic reduction unit.

Still another aim is to provide a transmission which provides for better dissipation of the heat produced by the braking action.

Another aim is to provide a transmission with integrated brake which can be manufactured with conventional equipment and systems.

With these and other aims in view, there is provided, in accordance with the present invention, a transmission with integrated brake particularly for vehicles, characterized in that it comprises, in an oil bath inside a containment and support casing, an epicyclic reduction unit which is kinematically connectable to a drive unit by means of at least two gears, of which the driven one is axially fixed, is coaxial to a sun gear of the reduction unit and is associated therewith by means of a splined coupling, a disk brake being arranged between said epicyclic reduction unit and said driven gear with at least one first disk rigidly coupled to an internally toothed ring gear which is rigidly coupled to said containment casing and at least one second disk which is rigidly coupled so as to rotate together with said driven gear, said disk brake being associated with axially movable, packing pushers.

BRIEF DESCRIPTION OF THE DRAWINGS

Further characteristics and advantages of the present invention will become apparent from the following detailed description of some preferred embodiments thereof, illustrated only by way of non-limitative example in the accompanying drawings, wherein:

FIG. 3 is an exploded view of details related to the pushers of the disk brake, the driven gear for connecting the reduction unit to the drive unit, and a vane pump for circulating the cooling oil;

FIG. 4 a sectional detail view of a first embodiment of a heat exchanger for the cooling oil;

FIG. 5 is a partially sectional view of a second embodiment of a heat exchanger for the cooling oil;

FIG. 6 is a sectional view, taken along the plane VI—VI of FIG. 5.

DESCRIPTION OF THE PREFERRED EMBODIMENTS

Figure 1:
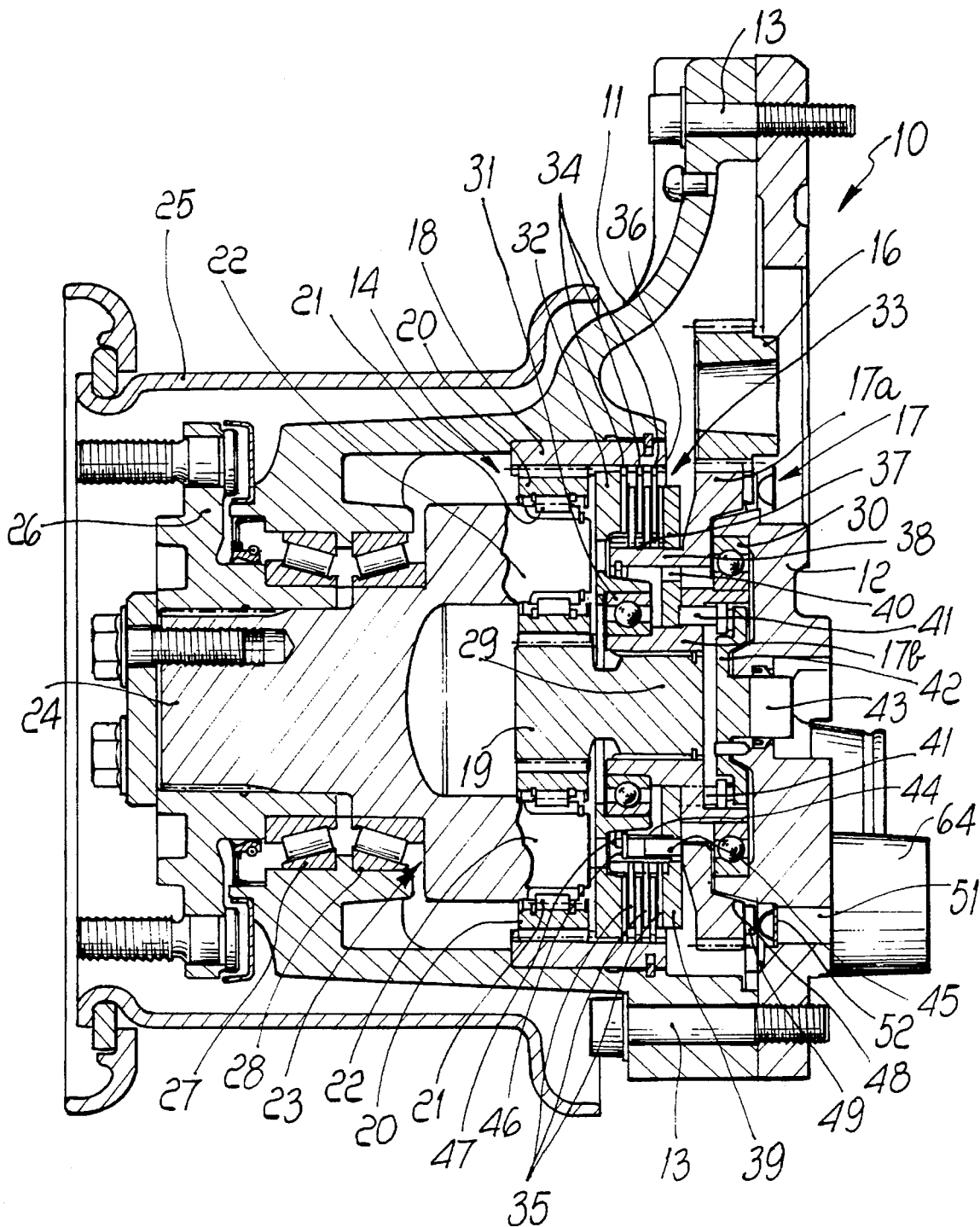
FIG. 1 is a longitudinal sectional view of a transmission with integrated brake according to the invention.
Figure 2:
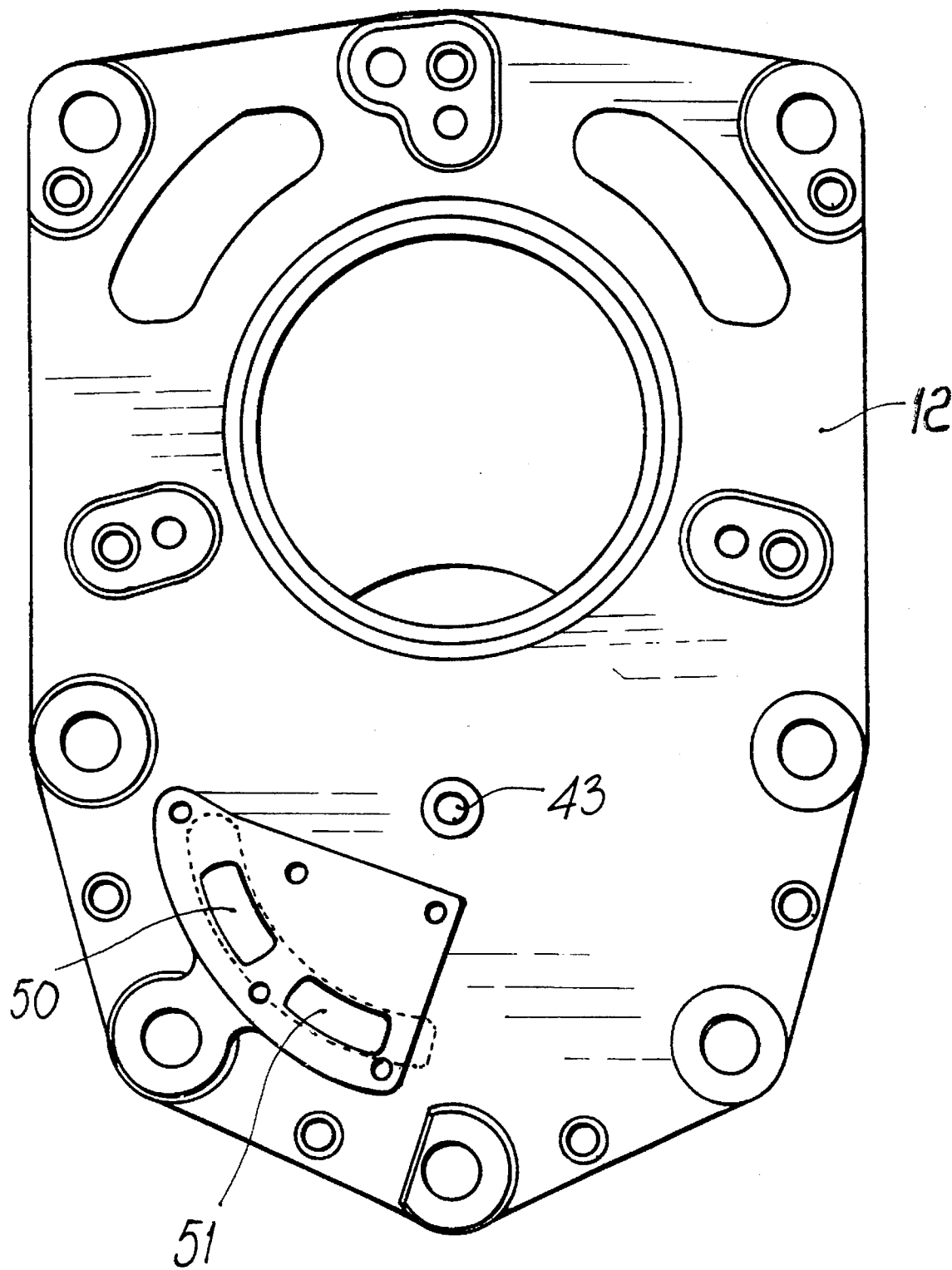
FIG. 2 is a front view of the cover of the casing which contains the transmission of FIG. 1.

With reference to the above figures, a casing 10, substantially composed of a bell-shaped containment body 11 and of a plate-like cover 12 bolted thereon by means of screws 13, contains an epicyclic reduction unit, generally designated by the reference numeral 14, which is kinematically connected to a drive unit 15, constituted for example by an electric motor, by means of a pair of gears, of a driving pinion 16 keyed on the driving shaft of the unit 15 and of a driven gear 17 which is arranged coaxially to the epicyclic reduction unit 14.

In particular, said epicyclic reduction unit 14 comprises: a gear 18, which is constituted by an internally toothed ring gear rigidly coupled to the casing 10; a sun gear 19, constituted by an externally toothed pinion; and planet gears 20 which mesh with the ring gear 18 and with the sun gear 19.

The planet gears 20 are rotatably coupled, by means of bearings 21, to respective bed pivots 22 which extend from a spider 23, an axial extension 24 whereof constitutes the shaft for a wheel 25.

A flange 26 for supporting the wheel 25 is in fact associated with the axial extension 24 by means of a splined coupling, and both are rotatably coupled to the body 11 by means of bearings 27 and 28 suitable for both radial and axial loads.

The sun gear 19 is provided with an axial extension 29 constituting a hub which, by means of a splined coupling, is connected to the driven gear 17 which rotates it.

Said driven gear 17 is constituted by two shaped disk-like elements 17a and 17b which are welded together and form the seats for two rotation bearings, the first one of which, designated by 30, is perimetrically connected to the cover 12 and the second one of which, designated by 31, is perimetrically connected to a ring 32 resting on said gear 18.

A disk brake, generally designated by the reference numeral 33, is arranged between the reduction unit 14 and the driven gear 17 and is composed of a first series of disks 34, which is rigidly coupled to said gear 18, and by a second series of disks 35, which is rigidly coupled to said driven gear 17.

The disks of the first series 34 are alternated with those of the second series 35.

The disks of the first series 34 have an external set of teeth which meshes with an extension 36 of the set of teeth 18, which thus also acts as disk holder.

The second series of disks 35 instead has an internal set of teeth which meshes with a set of teeth 37 of a tubular wing 38 of the gear 17, which thus acts as disk holder.

Packing of the disks of the series 34 and 35 is obtained by a disk-like pusher 39 provided with slots 40; the sectors into which the wing 38 is divided pass through said slots.

The pusher 39 is connected to pusher means comprising axial pins 41 which pass through said driven gear 17 in adapted holes thereof and are associated with a thrust actuation mean comprising a thrust flange 42 from which a further pin 43 extends; said pin protrudes from the cover 12, axially with respect to the gear 17, and the external thrust actuation means act thereon.

Packing is contrasted by at least one cylindrical helical spring 44 which acts between the pusher 39 and the wing 38 and is supported by a pivot 45 which extends axially from the gear 17.

In particular, said spring 44 rests on the pusher 39 on one side and, on the other side, on a plate 46 which is connected to the wing 38 by means of elastic rings 47.

The casing 10 is completely filled with cooling oil, and a disk-like element 48 is fixed to said driven gear 17, on the side opposite to said disk brake 33 and thus adjacent to the cover 12; said disk-like element is made of thin metal plate, and radial vanes 49 are formed thereon by blanking and pressing.

A sort of centrifugal pump for the oil is thus formed.

A plate 52 shaped like a circular sector is fixed on the internal part on a portion of the cover which is crossed by two slotted holes, respectively 50 and 51; two series of pockets, respectively 53 and 54, are formed on said plate 52 by blanking and pressing, correspond to each slotted hole 50 and 51, and are configured so as to receive the oil which is centrifuged by the vanes 49 for both rotation directions.

The pockets 53 and 54 are open onto the respective holes 50 and 51; a tube nest is externally connected to said holes and can advantageously be of two kinds.

In a first case, the tube nest, designated by the reference numeral 55, is composed of U-shaped smooth tubes which flank the drive unit 15.

A plurality of partitions 56 is arranged outside the nest 55 in order to force the air striking it to follow a convoluted path.

In a second case, the tube nest, designated by the reference numeral 57, is composed of a finned tube which surrounds the cooling fan 15a of the drive unit 15 in a spiral-like manner within the stamped-plate volute 15b of said drive unit.

The tube has appropriate straight ends 57a and 57b which are connected to the holes 50 and 51.

During rotation, the oil contained in the casing 10 circulates continuously between the various gears and is cooled by means of the tube nest 55 or 57.

At this point it should be stressed that the packing thrust is not applied to the driven gear 17, which is conveniently axially fixed.

Its coupling to the pinion 16 therefore does not entail any relative axial movement, and it is possible to adopt helical teeth.

It should also be noted that the gear 17 is supported by two bearings; overall construction is thus stronger than known types.

A considerable improvement is achieved from the point of view of the kinematic chain.

It should also be noted that the contrast spring does not act on components of the epicyclic reduction unit.

An oil cooling system is furthermore provided in order to dissipate the considerable heat formed during braking.

In practice it has been observed that the intended aim and objects of the present invention have been achieved.

The invention thus conceived is susceptible to numerous modifications and variations, all of which are within the scope of the inventive concept.

All the details may furthermore be replaced with other technically equivalent elements.

In practice, the materials employed, so long as they are compatible with the contingent use, as well as the dimensions, may be any according to the requirements.

We claim

1. Transmission with integrated brake particularly for vehicles, comprising:

a containment and support casing enclosing an oil bath therein;

an epicyclic reduction unit being housed in said casing, said reduction unit having a toothed ring gear being coupled to said casing for rotating therewith;

at least two gears for kinematically connecting said reduction unit to a drive unit of a vehicle, one of said at least two gears being a driven gear, said driven gear being axially fixed, coaxial to a sun gear of the reduction unit and in meshing association with said sun gear through a splined coupling;

a disk brake being arranged between said epicyclic reduction unit and said driven gear, said disk brake comprising at least a first and a second disk, said first disks being fixedly mounted against relative rotation to said ring gear and said second disks being fixedly mounted to said driven gear for rotating therewith, said first and second disks being axially movable under a packing thrust;

a packing pusher being associated with said disk brake, said packing pusher being axially movable between said driven gear and said disk brake for applying said packing thrust on said disk brake;

a pusher means for acting on said packing pusher, wherein said pusher means passes through axial holes provided in said driven gear and are actuated by thrust actuation means acting axially on said pusher means.

2. Transmission according to claim 1, further comprising means for cooling the oil contained in said casing.

3. Transmission according to claim 1, wherein said casing is composed of a bell-shaped containment body and of a plate-like cover bolted onto said body.

4. Transmission according to claim 1, wherein said gears which connect said epicyclic reduction unit and said drive unit comprise a driving pinion actuated by said drive unit, the other gear being a driven gear arranged coaxially to said epicyclic reduction unit.

5. Transmission according to claim 1, wherein said epicyclic reduction unit comprises said internally toothed ring gear which is rigidly coupled to said casing, said sun gear which is constituted by an externally toothed pinion, and planet gears which mesh with said ring gear and with said sun gear, said planet gears being rotatably coupled, by means of bearings, to respective bed pivots which extend from a spider, an axial extension whereof constitutes the shaft for a wheel.

6. Transmission according to claim 5, wherein said sun gear has an axial extension which constitutes a hub which is coupled to said driven gear.

7. Transmission according to claim 3, wherein said driven gear can rotate by means of two rotation bearings, a first bearing being connected to said cover and a second bearing being connected to a ring which rests on said internally toothed ring gear.

8. Transmission according to claim 1, wherein said at least one first disk is provided with an external set of teeth which meshes with an extension of the set of teeth of said internally toothed ring gear, which thus acts as a disk holder.

9. Transmission according to claim 1, wherein said at least one second disk has an internal set of teeth which meshes with a corresponding set of teeth of a tubular wing, divided into sectors, of said driven gear, which thus acts as a disk holder.

10. Transmission according to claim 7, wherein said packing pusher comprises a disk-like pusher provided with slots which are appropriately crossed by said sectors into which said disk-holder wing of said driven gear is divided, said packing pusher being connected to said pusher means comprising axial pins which pass through said driven gear and are associated with said thrust actuation means comprising a thrust flange from which a further pin extends, said pin protruding from said cover.

11. Transmission according to claim 10, further comprising at least one spring suitable to contrast the packing of said brake, said spring being of the cylindrical helical type and acting between said disk-like pusher and said disk-holder wing of said driven gear.

12. Transmission according to claim 2, wherein said cooling means comprises a disk-like element which is made of metal plate and is axially fixed on said driven gear, on a side opposite to said disk brake and thus adjacent to said cover, radial vanes being formed on said disk-like element by blanking and pressing.

13. Transmission according to claim 12, wherein said cooling means further comprises a plate shaped like a circular sector which is fixed inside said cover in the outlet region of two slotted holes which pass through said cover, two series of pockets being formed on said plate by blanking and pressing, said series of pockets matching each one of said slotted holes, said pockets being shaped so as to receive the oil which is centrifuged by said vanes for both directions of rotation of said driven gear, said pockets being open onto the respective holes.

14. Transmission according to claim 13, wherein a tube nest is connected on said slotted holes.

15. Transmission according to claim 14, wherein said tube nest is composed of tubes arranged laterally adjacent to said drive unit.

16. Transmission according to claim 14, wherein said tube nest is composed of at least one tube which surrounds a cooling fan of said transmission.

17. Transmission according to claim 14, wherein partitions adapted for making air which strikes the tube nest to follow a convoluted path are arranged outside said tube nest.

18. Transmission according to claim 14, wherein the tubes of said nest are smooth.

19. Transmission according to claim 14, wherein the tubes of said nest are finned.

20. Transmission with integrated brake particularly for vehicles, comprising:

a containment and support casing enclosing an oil bath therein;

an epicyclic reduction unit being housed in said casing, said reduction unit having a toothed ring gear being coupled to said casing for rotating therewith;

at least two gears for kinematically connecting said reduction unit to a drive unit of a vehicle, one of said at least two gears being a driven gear, said driven gear being axially fixed, coaxial to a sun gear of the reduction unit and in meshing association with said sun gear through a splined coupling;

a disk brake being arranged between said epicyclic reduction unit and said driven gear, said disk brake comprising at least a first and a second disk, said first disks being fixedly mounted against relative rotation to said ring gear and said second disks being fixedly mounted to said driven gear for rotating therewith, said first and second disks being axially movable under a packing thrust;

a packing pusher being associated with said disk brake, said packing pusher being axially movable between said driven gear and said disk brake for applying said packing thrust on said disk brake;

a pusher means for acting on said packing pusher, said pusher means being actuated by thrust actuation means acting axially thereon;

cooling means for cooling the oil of said oil bath, said cooling means comprising a disk-like element which is fixed to said driven gear for rotating therewith, radial vanes being provided on said disk-like element, said vanes exerting on said oil during rotation of said disk-like element a centrifugal pumping action.

* * * * *